Figure 1:
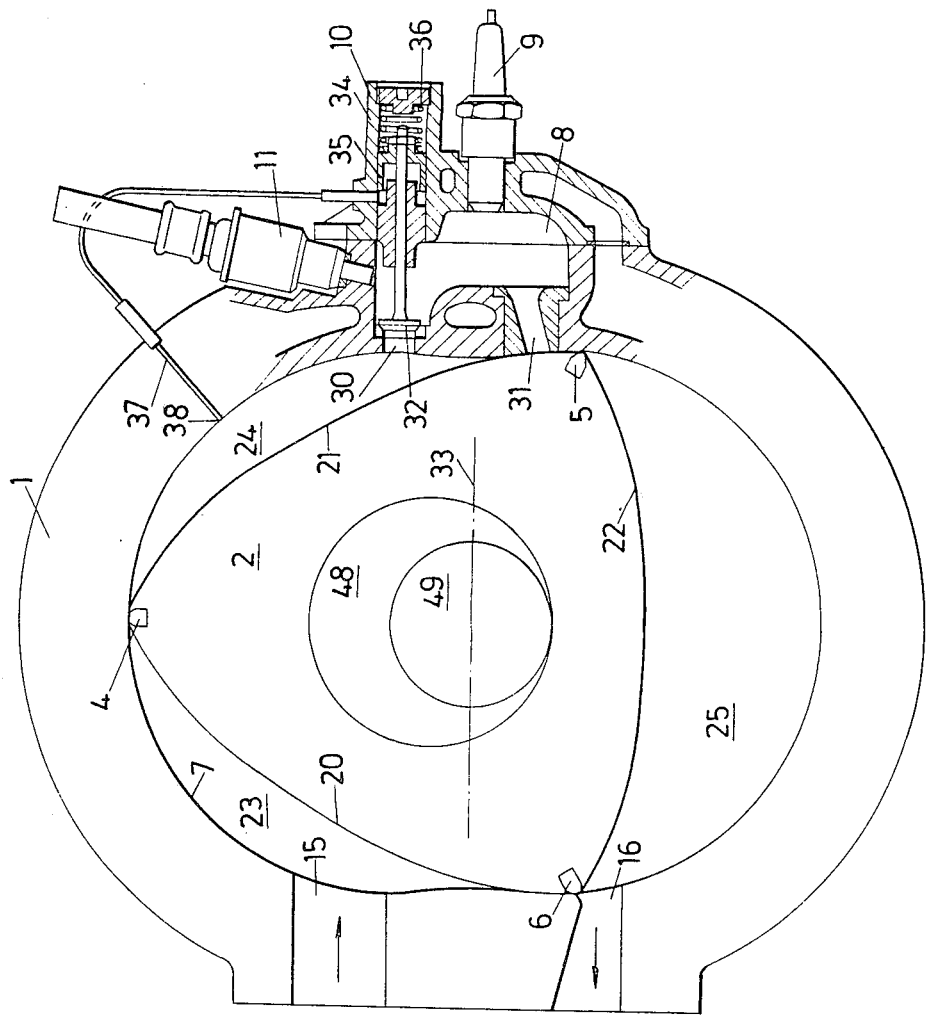

United States Patent [19]

Thaler

[11] 3,949,712
[45] Apr. 13, 1976

[54] ROTARY-PISTON INTERNAL COMBUSTION ENGINE HAVING A COMBUSTION ANTECHAMBER

[75] Inventor: Konrad Thaler, Russelsheim, Germany

[73] Assignee: General Motors Corporation, Detroit, Mich.

[22] Filed: Nov. 15, 1974

[21] Appl. No.: 524,130

[30] Foreign Application Priority Data
Dec. 20, 1973   Germany............................ 2363491

[52] U.S. Cl................................ 123/8.09; 123/8.27
[51] Int. Cl.² ........................................ F02B 53/10
[58] Field of Search ......... 60/39.61; 123/8.09, 8.13, 123/8.27

[56] References Cited
UNITED STATES PATENTS

| | | | |
|---|---|---|---|
| 3,227,145 | 1/1966 | Bernard ............................ | 123/8.09 |
| 3,572,030 | 3/1971 | Cuff................................... | 60/39.61 |
| 3,782,107 | 1/1974 | Bendall ......................... | 123/8.09 X |
| 3,868,930 | 3/1975 | Klomp et al. ..................... | 123/8.13 |

FOREIGN PATENTS OR APPLICATIONS

| | | | |
|---|---|---|---|
| 1,807,755 | 5/1970 | Germany ........................... | 123/8.09 |
| 1,218,872 | 1/1971 | United Kingdom................ | 123/8.45 |

Primary Examiner—Carlton R. Croyle
Assistant Examiner—Michael Koczo, Jr.
Attorney, Agent, or Firm—R. L. Phillips

[57] ABSTRACT

A rotary piston internal combustion engine having a combustion antechamber connected to the trochoidal cavity by a firing passage and an inlet passage, which latter is opened or closed by a valve operable by the engine so as to provide forced scavenging of the combustion antechamber. The valve may be operated by the pressure in the compression space of the engine, which pressure is conducted by a conduit to the valve, or may be operated by an engine-driven camshaft.

1 Claim, 2 Drawing Figures

ROTARY-PISTON INTERNAL COMBUSTION ENGINE HAVING A COMBUSTION ANTECHAMBER

The invention relates to a rotary-piston internal combustion engine having a casing which encloses a trochoidal space and in which there is an antechamber with spark plug, fuel injection nozzle and a firing passage.

As regards the expulsion of noxious exhaust gases, the known rotary-piston engines and the conventional reciprocating piston engines are approximately equal. Although the rotary-piston engines with their long drawnout combustion spaces and their relatively high surface/volume ratios exhibit advantages over reciprocating engines as regards the $No_x$ emissions, they are slightly inferior as regards HC expulsion and specific fuel consumption. In this connection various research investigations have pointed to uneven combustion in the elongated combustion space and particularly to defective combustion at the trailing side of the rotor.

In order to diminish noxious emission of exhaust gases and to attain a higher efficiency, it is already known to provide an antechamber with a spark plug and fuel injection nozzle. The fuel charge of the antechamber fires a fuel charge in the combustion space of the engine, this latter charge being set too weak for it to be fired by a spark plug or other ignition device. Upon ignition of the relatively rich fuel mixture in the antechamber, a hot gas jet passes through the firing passage connecting the antechamber with the combustion chamber and it ignites the weak mixture in the engine space and drives the rotary piston.

The problem underlying the invention is to further improve engines of this kind in order to attain a lower fuel consumption and achieve a higher efficiency. Moreover, controlled combustion by means of a stratified or layered charge or by energetic fuel preparation will ensure that combustion of the fuel in the engine is as complete as possible so that the exhaust gas contains an extremely low proportion of noxious components and of incompletely oxidised hydrocarbons and carbons. Advantageously, this is attained according to the invention by arranging that the firing passage discharge into the hot arc of the trochoidal space, in immediate proximity to the minor axis of the trochoidal space and runs obliquely to this minor axis in the direction of rotation of the rotary piston.

Due to the special position and arrangement of the antechamber and the firing passage, a charge layering or an energetic mixture preparation is attained under favourable conditions. Further there is a considerable simplification of the ignition system, permitting for example the use of a distributor, one ordinary spark plug per rotor, and coil ignition. These advantages are particularly attributable to the fact that it is easier to create inflammability of the fuel mixture in proximity to the spark plug and that, in the upper dead-centre position of the rotor, the remaining compression volume at the trailing side of the rotor is not ignited, i.e., combustion is restricted to the leading side of the rotor. Since the firing passage runs oblique to the minor axis of the trochoidal space in the direction of turning of the rotary piston, and since the firing in the main combustion space, which takes place under excess air, occurs at the leading side only, the torque on the rotor in the direction of turning is intensified.

With the system of layer charge or of energetic mixture preparation (pressure energy, velocity energy and temperature energy), it is a question of a controlled combustion, with the initiation of combustion taking place in the antechamber and being passed on to the main combustion chamber by way of the firing passage. In the case of the layer charge, an easily combustible rich mixture $$\left(\lambda = \frac{\text{actual air-fuel ratio}}{\text{stoichiometric air-fuel ratio}} = 0.8/1.0\right)$$

is present in the antechamber, and in the case of energetic mixture preparation an easily combustible rich mixture ($\lambda = 0.7 / 1.0$) is likewise present round the spark plug, as well as a film of fuel in front of the firing passage. In the main combustion space, there is a weak mixture ($\lambda = 1.4 / 2.0$) in the case of the layer charge, and only air in the case of the energetic mixture preparation.

According to the invention, forced scavenging of the antechamber is promoted by an inlet port, with valve, for the antechamber, such port being arranged before the firing passage in the direction of rotation of the rotary piston. The valve of the inlet port may be connected to a piston which is arranged in a cylinder and is controlled by the compression pressure of the rotary piston, by way of a pipe line opening into the compression space of the engine. The valve of the inlet port may however also be controlled mechanically by a camshaft driven from the engine. Finally, an inlet port with a rotary valve spool may also be provided for forced scavenging.

Figure 2:
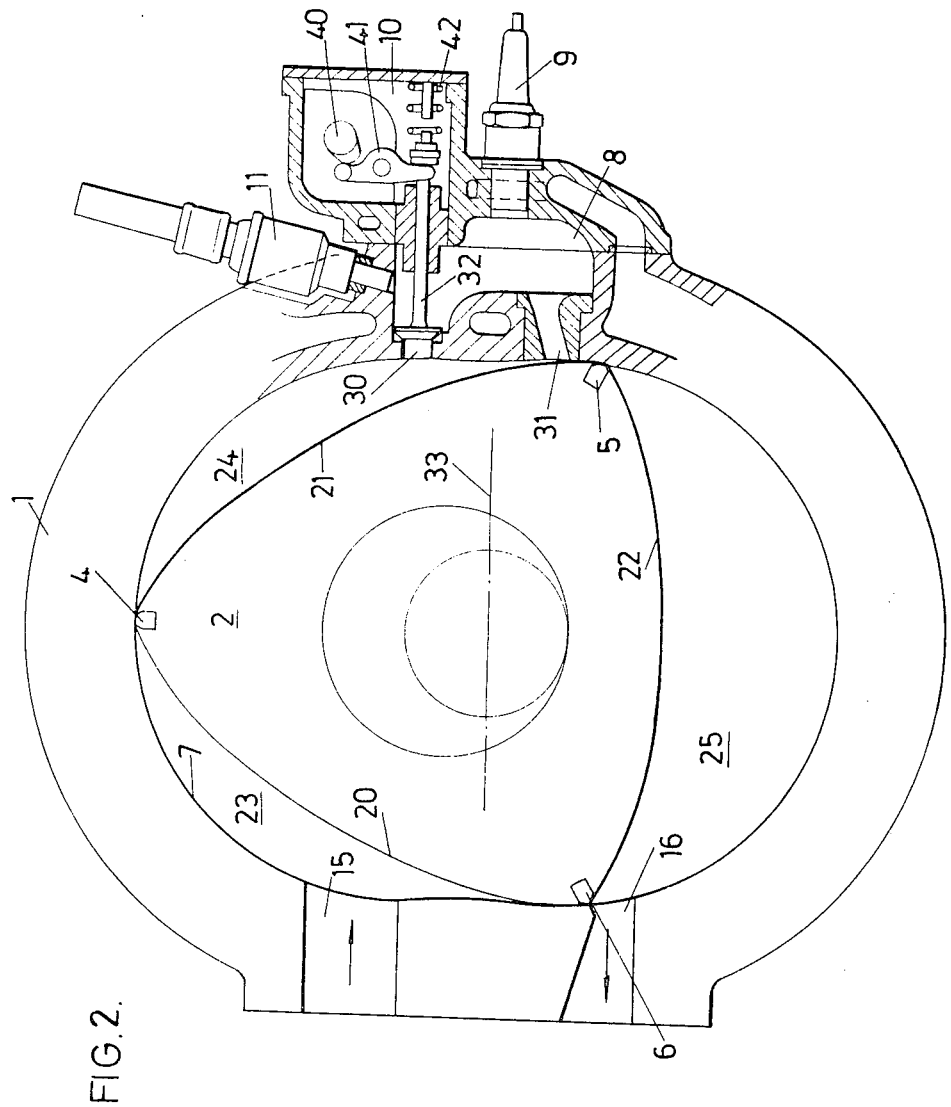

Further features and advantages of the invention will be apparent from the drawing and relevant description. Embodiments of the invention by way of example are illustrated in the drawing in which:

FIG. 1 is a schematic view of the rotary-piston engine with a section through the combustion antechamber and a pressure-controlled valve arrangement; and FIG. 2 is a section through the combustion antechamber and a valve arrangement controlled mechanically via a camshaft.

The rotary-piston engine according to FIGS. 1 and 2 consists of the casing 1 closed by a pair of axially spaced end walls (not shown), the rotary piston 2, whose corners 4, 5 and 6 slide along a trochoidal track 7 forming the internal periphery of the cavity provided by casing 1, the combustion antechamber 8 with the spark plug 9, the valve arrangement 10 and the fuel injection nozzle 11. Provided in casing 1 there are the inlet passage 15 and outlet passage 16 for the fuel mixture or air as the case may be. Between the three piston faces 20, 21 and 22 and the casing 1, three spaces are formed, namely the induction or suction space 23, the compression space 24 and the expansion space 25. The antechamber 8 has two ports leading in to the compression space 24, and of these the inlet port 30 lies in the "cold arc" of the casing 1, in front of the firing passage 31 seen in the direction of rotation of piston 2. The firing passage 31 lies in the "hot arc" of the casing 1. The inlet port 30 is closed by a valve 32 and the firing passage 31 runs oblique to the minor axis 33 of the space bounded by the track 7, in the direction of rotation of piston 2. The openings (port 30 and passage 31) are located in immediate proximity to the minor axis 33, and at either side of same. In known manner the piston 2 is mounted for rotation on an eccentric 48 provided on an output shaft 49 which is rotatably supported by the end walls (not shown) of casing 1.

In the embodiment according to FIG. 1, the valve arrangement 10 is controlled by the pressure arising in the compression space 24. With this object, the space 24 is connected to cylinder 34 of the valve arrangement 10 by way of a pipe line 37 which opens into space 24 before port 30, seen in the direction of rotation of piston 2. The line 37 opens into the compression space 24 approximately at the place where the trailing sealing edge, for example 4, of the compression space 24 is situated when the corresponding face, for example 21, of the rotary piston is at right angles to the minor axis 33 of the trochoid. Located in cylinder 34 there is a piston 35 which is connected to the stem of valve 32 and is under the action of a helical spring 36. When the pressure in space 24 has attained a certain value, then piston 35 overcomes the effort of spring 36 and moves towards the right so that valve 32 opens inlet port 30, and the fuel mixture or air in space 24 passes in through port 30 and out again through the firing passage 31 to provide forced scavenging of the antechamber 8.

In the embodiment according to FIG. 2, the pressure-control of valve 32 is replaced by a mechanical control through a camshaft 40 and rocker 41 acting on valve 32 which is constrained by the helical spring 42.

In the position shown in FIG. 1 for the rightwards turning rotary piston 2, the induced mixture or the induced air is pre-compressed in the space 24 which lies before the sealing strip of the piston corner 5. The compression pressure passes via pipe line 37 into the working space of piston 35 connected to valve 32 and the compression is already so high that the inlet valve 32 to the antechamber 8 opens. At the moment when the corner 4 of rotary piston 2 passes over the connection point 38 of line 37 with the working space of piston 35, the pressure in the working space drops instantly, with the result that the inlet valve 32 closes, under the action of spring 36, shortly before attainment of maximum compression in the space 24. Then the compressed highly inflammable mixture is fired. The high flow velocity in the transfer port 30 ensures an excellent mixture preparation of the fuel introduced here. The closing pressure is raised still further by the ignition pressure. The combustion initiated in antechamber 8 leads to an intense pressure rise with expansion of the gases through the firing passage 31 into the main combustion space between rotary piston 2 and casing 1. At the instant of ignition, after the inlet valve 32 to the antechamber has closed, a proportion of about 25 to 50 percent of the compressed mixture or air is in the antechamber 8. As the rotary piston 2 revolves, the remaining percentage left between piston 2 and casing 1, is led past the firing passage 31 for combustion under excess of air.

Both with the engine according to FIG. 1 as well as with that according to FIG. 2, it is possible to operate with layer charge by inducing, via inlet passage 15, a weak mixture ($\lambda = 1.4 / 2.0$) whihc has been prepared by means of a carburettor or by injection. After about ⅔rds of the compression stroke has run, valve 32 opens and about 25 to 50 percent of the compression volume is pushed over into the antechamber 8, improving the mixture formation. Whilst utilising the resulting high flow velocity, fuel is delivered once more, and the weak mixture is conditioned into a rich combustible mixture ($\lambda = 0.8 / 1.0$) by intense turbulence. After initiation of ignition, the pressure rise takes place in antechamber 8 shortly after the upper dead-centre. This pressure rise and the release of pressure from the pressure-control line 37 by the trailing side of the rotor (or the pressure rise and the mechanical cam drive 40) bring about closure of valve 32. Moreover, the pressure rise causes the combustion gases to be expelled under high energy and through turbulence into the main combustion space. Acting like a torch, they ignite the less inflammable weak residual mixture in the main combustion space, thus resulting in final burning, unpolluted by waste gases.

The engines according to FIGS. 1 and 2 may also be operated by energetic mixture preparation. In this case, instead of the mixture, air is induced and compressed into the antechamber. By using efficient turbulence and transfer velocity, the now injected fuel is for some part prepared into a combustible mixture in proximity to the spark plug whilst the main quantity of the jet is disposed as a film in front of the firing passage 31. After initiation of ignition, the pre-combustion in antechamber 8 brings about a high pressure rise and therefore high exit velocities and turbulence of the partially burnt gases. It also brings about the entraining and preparation of the fuel disposed in front of firing passage 31. In the main combustion space therefore, an excellent addition of residual air to the partially burnt gases and fuel particles takes place. The result is that, under excess air, final combustion freed from waste gases is achieved. In order to diminish the partial air volume in the main combustion chamber and to reduce the accuracy of fit of the rotor contour, highly refractory sealing strips may be inset into the rotor 2 at the leading side.

The engine according to the invention has the advantage that noxious waste gases are reduced and the specific fuel consumption is lowered. Further, a simplification of the ignition system is attained whilst a better and less noisy combustion is achieved.

I claim:

1. A rotary-piston internal combustion engine comprising a casing providing a trochoidal cavity, a rotary piston disposed within said cavity, an output shaft rotatably supported by the casing and having an eccentric rotatably supporting the piston, said piston having faces bounding, with said casing, variable volume working spaces distributed around the rotary piston and which move with said piston within the casing and act successively as induction space, compression space, and expansion space, inlet passage means and outlet passage means, each said passage means being periodically connected to each of said working spaces as the piston moves; said engine including also the following combination: a combustion antechamber which has a spark plug and a fuel injection nozzle and is connected to said trochoidal cavity by an inlet port and by a firing passage, said firing passage opening into said cavity in immediate proximity to the minor axis of said cavity and running obliquely to said minor axis in the direction of rotation of the piston; said inlet port being arranged before the firing passage, in the direction of rotation of said piston; and a valve operable to control said inlet port in accordance with the position of the rotary piston in such a way that during compression in said compression space the inlet port is opened in a certain position of the rotary piston and is closed shortly before attainment of maximum compression; said valve being connected to a piston movable in a cylinder by spring loading towards closure, and said cylinder being connected by a conduit line to the compression space whereby the piston is loadable by compression force in valve-opening direction; the connection of said conduit line to the compression space being approximately at the position where the trailing edge of that rotary piston face bounding the compression space is situated when said piston face is at right angles to the minor axis of the trochoidal cavity so that at approximately two-thirds of the way into the compression phase the valve opens and approximately one-fourth to one-half of the compression volume is forced into the antechamber.

* * * * *